United States Patent
Sakaguchi

(10) Patent No.: US 8,154,207 B2
(45) Date of Patent: Apr. 10, 2012

(54) LIGHT APPARATUS CONTROL SYSTEM FOR VEHICLE

(75) Inventor: Koji Sakaguchi, Kariya (JP)

(73) Assignee: Denso Corporation, Kariya (JP)

( * ) Notice: Subject to any disclaimer, the term of this patent is extended or adjusted under 35 U.S.C. 154(b) by 280 days.

(21) Appl. No.: 12/571,742

(22) Filed: Oct. 1, 2009

(65) Prior Publication Data

US 2010/0079072 A1    Apr. 1, 2010

(30) Foreign Application Priority Data

Oct. 1, 2008    (JP) .................... 2008-256759

(51) Int. Cl.
*B60Q 1/14*    (2006.01)
(52) U.S. Cl. ............ 315/77; 315/76; 315/149; 315/151; 315/153; 315/154; 315/157; 362/459; 362/466
(58) Field of Classification Search .................. 315/77, 315/82, 83; 362/26, 27, 459, 465
See application file for complete search history.

(56) References Cited

U.S. PATENT DOCUMENTS

| 2003/0138132 A1* | 7/2003 | Stam et al. .................... 382/104 |
| 2005/0157509 A1* | 7/2005 | Tsukamoto .................... 362/465 |

FOREIGN PATENT DOCUMENTS

| JP | 61-119843 | 7/1986 |
| JP | 62-253540 | 11/1987 |
| JP | 2949627 | 7/1999 |
| JP | 2005-199974 | 7/2005 |

\* cited by examiner

*Primary Examiner* — Douglas W Owens
*Assistant Examiner* — Jonathan Cooper
(74) *Attorney, Agent, or Firm* — Nixon & Vanderhye P.C.

(57) ABSTRACT

A control unit determines whether a vehicle has entered an area under a covering object that covers the upper side of the vehicle. In the case where the control unit determines that the vehicle has entered the area under the covering object, the control unit turns on light apparatus when both of a measurement of an upper light intensity, which is measured with an upper light intensity sensor, and a measurement of a front light intensity, which is measured with a front light intensity sensor, require turning on of the light apparatus.

21 Claims, 4 Drawing Sheets

LIGHT APPARATUS CONTROL SYSTEM FOR VEHICLE

CROSS REFERENCE TO RELATED APPLICATION

This application is based on and incorporates herein by reference Japanese Patent Application No. 2008-256759 filed on Oct. 1, 2008.

BACKGROUND OF THE INVENTION

1. Field of the Invention

The present invention relates to a light apparatus control system for a vehicle.

2. Description of Related Art

A known light apparatus control system installed in a vehicle measures a light intensity (illuminance) of ambient light applied from outside of the vehicle and turns on light apparatuses (e.g., headlamps) of the vehicle when the light intensity of the ambient light is decreased below a light-on threshold value. In such a light apparatus control system, it is desirable to turn on the light apparatuses of the vehicle as fast as possible at the time of entering an inlet of a tunnel and to keep an off-state of the light apparatuses of the vehicle at the time of passing through a road area under a covering object, such as an elevated bridge where the turning on of the light apparatus is not necessary.

In a case of Japanese Patent No. 2949627B2, besides an absolute value of the light intensity of the ambient light applied from outside of the vehicle, a slope of change (gradient of change) in the light intensity of the ambient light from the bright state to the dark state is measured. When the slope is steep, i.e., when the light intensity of the ambient light is decreased rapidly, it is determined that the vehicle has entered the road area under the covering object (e.g., the tunnel or elevated bridge), and the light-on threshold value is decreased. In this way, flashing (instantaneous turning on and off) of the light apparatuses on the road area under the elevated bridge is prevented.

Furthermore, the light apparatus control system of the vehicle recited in Japanese Unexamined Patent Publication No. 2005-199974A (corresponding to US 2005/0157509A1) has an upper light intensity sensor and a front light intensity sensor. The upper light intensity sensor measures a light intensity of ambient light, which is applied to the upper light intensity sensor from the upper side of the vehicle. The front light intensity sensor measures a light intensity of the ambient light, which is applied to the front light intensity sensor from the front side of the vehicle. The light apparatus control system of Japanese Unexamined Patent Publication No. 2005-199974A detects presence of the tunnel when the light intensity of the ambient light, which is measured with the front light intensity sensor, is decreased below a predetermined value. When the presence of the tunnel is detected, the light-on threshold value is increased (raised), so that the light apparatuses can be turned on quickly.

As discussed above, in the case of Japanese Patent No. 2949627B2, the light-on threshold value is reduced in the case where the slope of the light intensity of the ambient light outside of the vehicle is steep at the time of decreasing of the light intensity, so that the flashing of the light apparatuses in the road area under the elevated bridge is prevented. However, in general, the brightness of the illumination at the inlet of the modern tunnel is increased in view of the dark adaptation of human eyes. Therefore, when the light-on threshold value is decreased, the light apparatuses of the vehicle may not be turned on. Furthermore, the low light intensity of the ambient light at, for example, the dusk time (sunset time) and the low vehicle speed caused by, for example, traffic jam should be concerned. In these cases, when the vehicle enters the road area under the elevated bridge, the rapid decreasing change in the slope of the light intensity of the ambient light cannot be detected, so that the flashing of the light apparatuses of the vehicle cannot be prevented.

In the case of Japanese Unexamined Patent Publication No. 2005-199974A (corresponding to US 2005/0157509A1), the presence of the tunnel is sensed when the light intensity of the ambient light, which is measured with the front light intensity sensor, is decreased below the predetermined value. When the presence of the tunnel is detected, the light-on threshold value is increased, so that the light apparatuses can be turned on quickly. However, the decrease of the light intensity of the ambient light, which is applied from the front side of the vehicle, occurs not only at the time of entering the tunnel but also at the time of passing through the road area under the covering object, such as the elevated bridge, where the turning on of the light apparatuses of the vehicle is not required, or at the dusk time. In these cases, the decrease of the light intensity of the ambient light applied from the front side of the vehicle is not smaller than that of the time of entering the tunnel. Accordingly, it may be possible to distinguish the tunnel from the elevated bridge and the dusk time. However, it is not possible to distinguish between the elevated bridge and the dusk time. Therefore, it may not be possible to appropriately perform the control operation to maintain the turning off of the light apparatuses of the vehicle in the road area under the elevated bridge and to turn on the light apparatuses of the vehicle at the dusk time.

SUMMARY OF THE INVENTION

The present invention addresses the above disadvantage. According to the present invention, there is provided a light apparatus control system for a vehicle, including a light apparatus, a drive means, a lighting control means, an upper light intensity sensing means, a front light intensity sensing means and an entry determining means. The light apparatus illuminates a space outside of the vehicle upon turning on thereof. The drive means is for driving the light apparatus to turn on or off the light apparatus. The lighting control means is for controlling the drive means to turn on or off the light apparatus based on a light intensity of ambient light applied form outside of the vehicle. The upper light intensity sensing means is for measuring an upper light intensity of the ambient light that is applied from an upper side of the vehicle. The front light intensity sensing means is for measuring a front light intensity of the ambient light that is applied from a front side of the vehicle. The entry determining means is for determining whether the vehicle has entered an area under a covering object that covers the upper side of the vehicle. In the case where the entry determining means determines that the vehicle has entered the area under the covering object, the lighting control means turns on the light apparatus by controlling the drive means when both of a measurement of the upper light intensity, which is measured with the upper light intensity sensing means, and a measurement of the front light intensity, which is measured with the front light intensity sensing means, require the turning on of the light apparatus.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

A light apparatus control system (also referred to as auto light apparatus control system) according to an embodiment of the present invention will be described with reference to the accompanying drawings.

Figure 1:
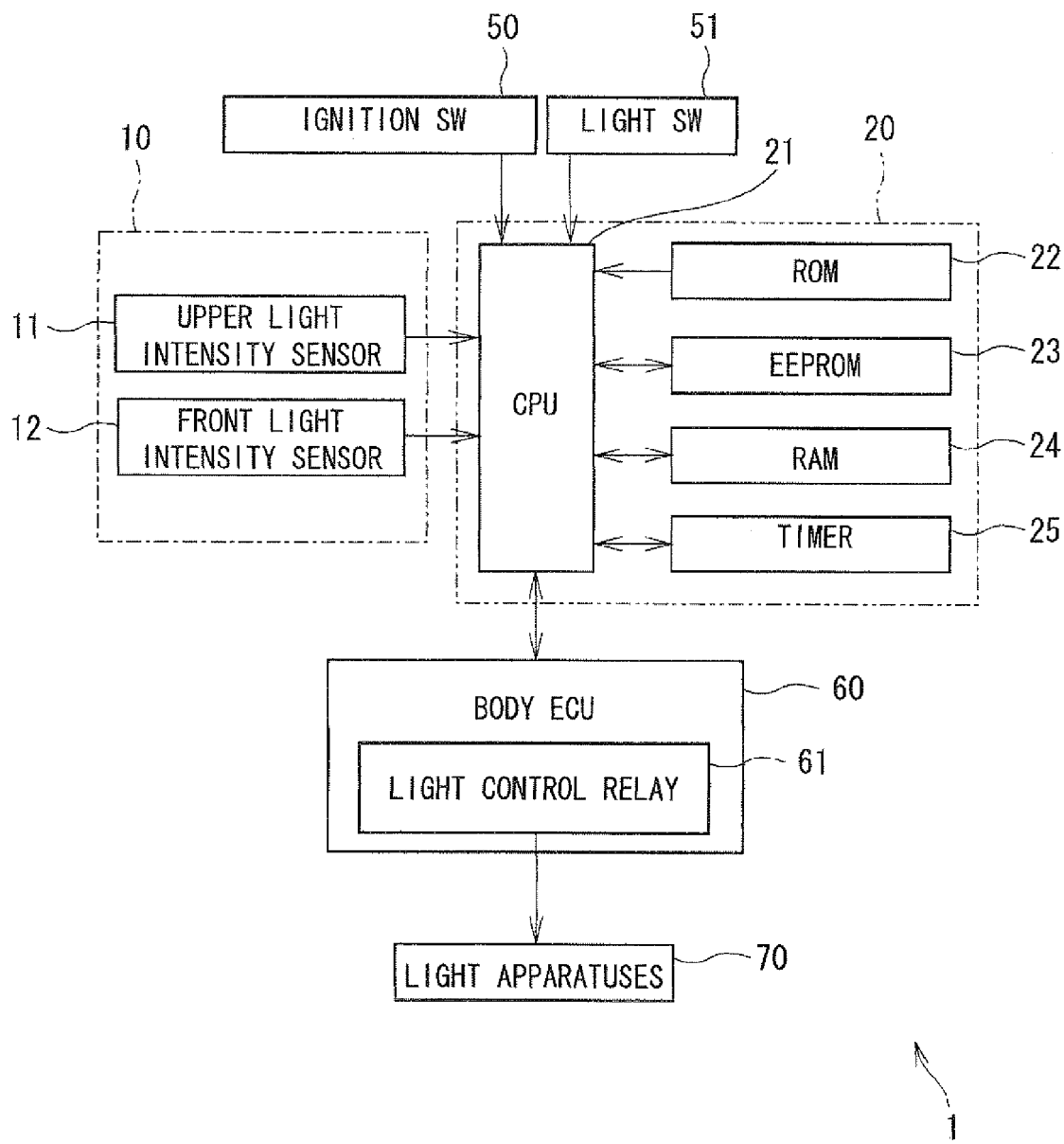
FIG. 1 is a block diagram schematically showing a structure of a light apparatus control system according to an embodiment of the present invention.

FIG. 1 is a block diagram schematically showing a structure of the light apparatus control system 1 of the present embodiment.

The light apparatus control system 1 includes a sensor apparatus 10, a light electronic control unit (hereinafter, referred to as a light ECU) 20, a body electronic control unit (hereinafter, referred to as a body ECU) 60 and light apparatuses (also referred to as lights or lamps) 70. The sensor apparatus 10 senses a change in the light intensity (illuminance) of the ambient light at the outside of the vehicle. The light ECU 20 controls turning on and off of the light apparatuses 70 (e.g., headlamps, small lamps, side lamps, tail lamps) of the vehicle based on signals outputted from the sensor apparatus 10.

The sensor apparatus 10 includes an upper light intensity sensor (serving as an upper light intensity sensing means) 11 and a front light intensity sensor (serving as a front light intensity sensing means) 12.

Figure 2:
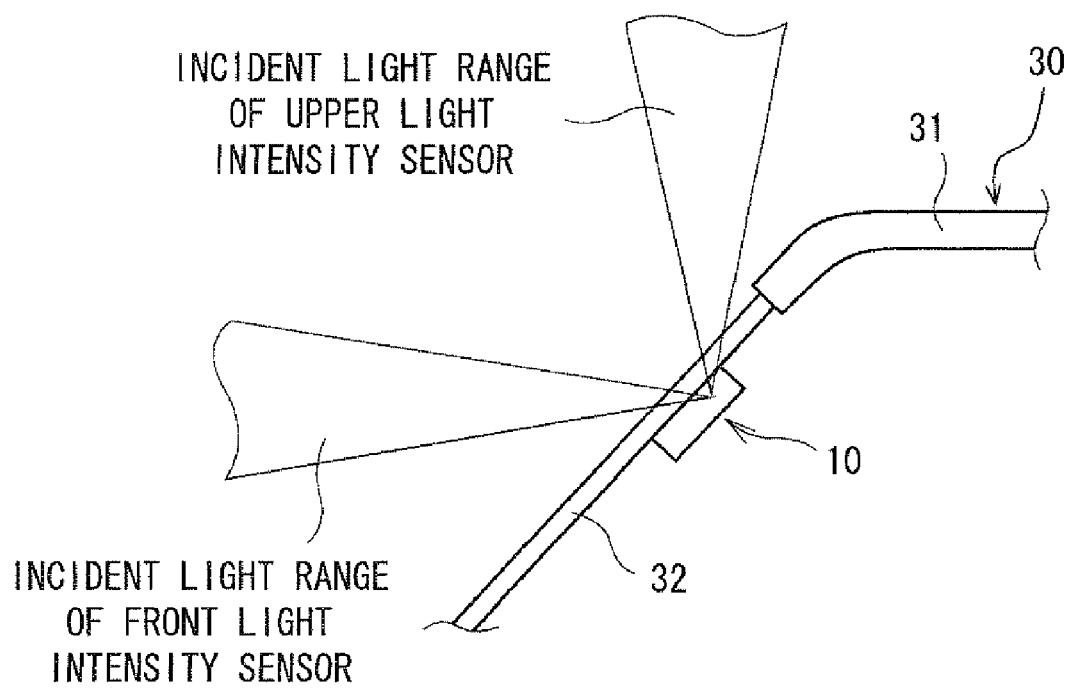
FIG. 2 is a schematic diagram showing an incident light range of an upper light intensity sensor and an incident light range of a front light intensity sensor of the light apparatus control system shown in FIG. 1.

As shown in FIG. 2, the sensor apparatus 10 is installed to an interior side surface of a front glass (windshield) 32 of the vehicle 30 at a location below a roof 31. The upper light intensity sensor 11 of the sensor apparatus 10 measures the light intensity (illuminance) of the ambient light, which is applied thereto within a predetermined incident angular range from the upper side of the vehicle 30, and the upper light intensity sensor 11 supplies a measurement signal, which indicates the measurement of the light intensity (illuminance) of the ambient light, to a central processing unit (CPU) 21 of the light ECU 20. The front light intensity sensor 12 of the sensor apparatus 10 measures the light intensity (illuminance) of the ambient light, which is applied thereto within a predetermined incident angular range from the front side of the vehicle 30, and the front light intensity sensor 12 supplies a measurement signal, which indicates the measurement of the light intensity (illuminance) of the ambient light, to the CPU 21 of the light ECU 20. Known light intensity sensors may be used as the upper light intensity sensor 11 and the front fight intensity sensor 12, respectively. In the present embodiment, photodiodes are used as the upper light intensity sensor 11 and the front light intensity sensor 12, respectively.

The light ECU 20 includes a known microcomputer as its main component. The microcomputer includes the CPU 21, a read only memory (ROM) 22, a nonvolatile memory (specifically, an electrically erasable, programmable read-only memory that is abbreviated as EEPROM) 23, a random access memory (RAM) 24, a timer 25, an undepicted input/output (I/O) device and an undepicted bus line for interconnecting them.

An ignition switch 50, a light switch 51 and the body ECU 60 are connected to the CPU 21. The light switch 51 is installed to a steering wheel of the vehicle 30 and is operated by a passenger (specifically, a driver) of the vehicle 30 to command turning on and off of the auto light apparatus control system, which automatically controls the turning on and off of the light apparatuses 70. The body ECU 60 includes a light control relay 61, which serves as a drive means and executes turning on and off of the light apparatuses 70.

In a state where the ignition switch 50 is turned on, and the auto light apparatus control system is turned on through manipulation of the light switch 51, the CPU 21 outputs the signal, which turns on or off the light apparatuses 70, to the body ECU 60 based on the signals received from the upper light intensity sensor 11 and the front light intensity sensor 12. The body ECU 60 can output the drive electric current for turning on the light apparatuses 70 through the light control relay 61 based on the signal from the CPU 21.

Various control programs, which are executed by the CPU 21, are stored in the ROM 22.

Figure 4:
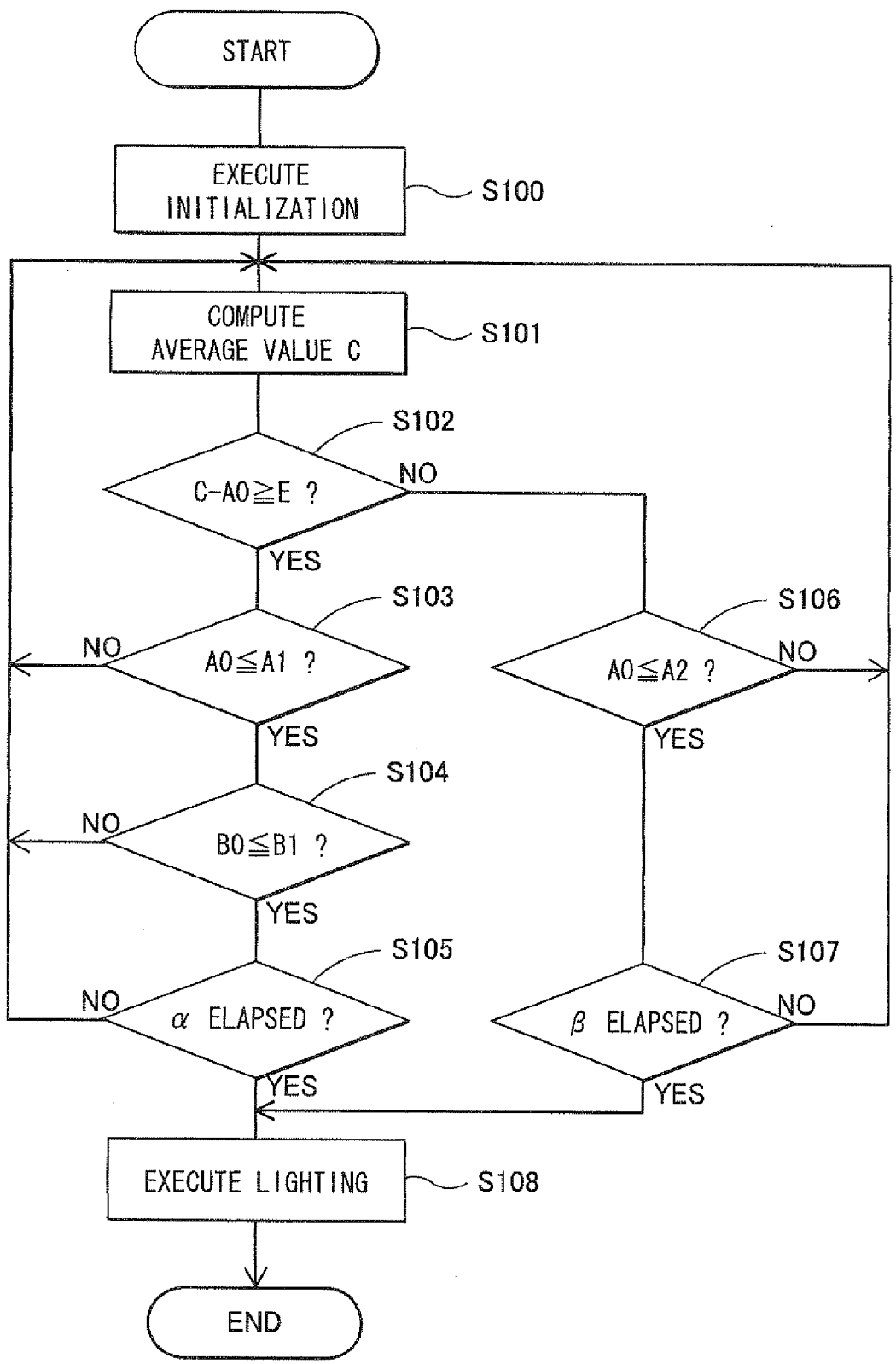
FIG. 4 is a flowchart showing a light control operation of the light apparatus control system.

The EEPROM 23 stores light-on threshold values, which serve as determination references for determining whether the light apparatuses 70 need to be turned on or off based on the measured intensities (illuminances) that are measured with the upper light intensity sensor 11 and the front light intensity sensor 12. Although details of the determination process will be described later with reference to FIG. 4, a first upper light intensity threshold value A1 and a second upper light intensity threshold value A2 are stored in the EEPROM 23 as the light-on threshold values. The first upper light intensity threshold value A1 is used when it is determined that the vehicle 30 has entered a road area (shaded road area) under a covering object, and the second upper light intensity threshold value A2 is used when it is determined that the vehicle 30 has not entered the road area under the covering object, i.e., is out of the road area under the covering object. The first upper light intensity threshold value A1 is equal to or larger than the second upper light intensity threshold value A2. That is, a relationship of $A1 \geq A2$ is satisfied. The EEPROM 23 also stores a front light intensity threshold value B1, which is used when it is determined that the vehicle 30 has entered the road area under the covering object. The EEPROM 23 further stores an upper light intensity difference reference value E, which is used to determine whether the vehicle 30 has entered the road area under the covering object. The difference reference value E is a reference value used to determine whether the vehicle 30 has entered the road area under the covering object (e.g., the tunnel or the elevated bridge) upon the rapid decrease in the upper light intensity caused by the presence of the covering object.

The EEPROM 23 also stores first delay time α that is used to turn on the light apparatuses 70 upon elapse of a predetermined time period from the time, at which the light intensities of the ambient light measured with the upper light intensity sensor 11 and the front light intensity sensor 12 reach the light-on threshold values, respectively, at the time of determining that the vehicle 30 has entered the road area under the covering object. The EEPROM 23 further stores second delay time β that is used to turn on the light apparatuses 70 upon elapse of a predetermined time period from the time, at which the light intensity of the ambient light measured with the upper light intensity sensor 11 reaches the light-on threshold value at the time of determining that the vehicle 30 is out of the road area under the covering object. The first delay time α is equal to or shorter than the second delay time β. That is, the relationship of $\alpha \leq \beta$ is satisfied.

The RAM 24 is used as a working storage space at the time of executing the operation at the CPU 21. The upper light intensity is measured and stored in the RAM 24 at predetermined time intervals (e.g., 100 millisecond intervals). The timer 25 measures the delayed time.

Figure 3:
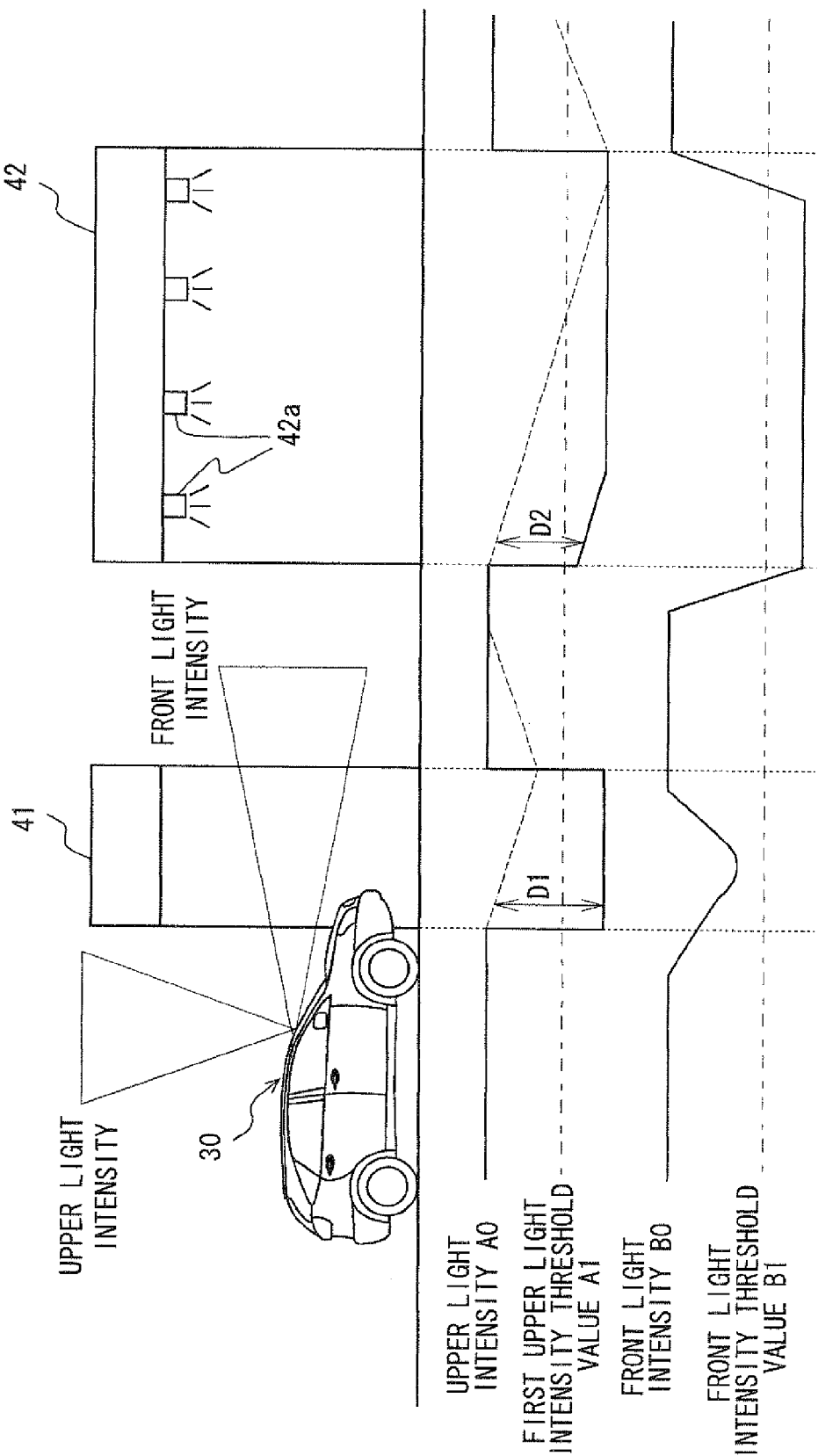
FIG. 3 is a diagram showing changes in the upper light intensity and the front light intensity during traveling of the vehicle.

Now, with reference to FIG. 3, the change in the upper light intensity A0 and the change in the front light intensity B0 during the traveling of the vehicle 30 will be described. FIG. 3 schematically shows the changes in the upper light intensity A0 and the front light intensity B0, and it is assumed that the vehicle 30 travels from an elevated bridge 41 side to a tunnel 42 side during daylight in the clear weather. In the case of FIG. 3, the elevated bridge 41 and the tunnel 42 serve as the covering objects, respectively. In FIG. 3, a solid line indicates the measured value of the light intensity of the ambient light, which is measured with the upper light intensity sensor or the front light intensity sensor, and a dotted line indicates an average value of the measurements of the upper light intensity, which are measured during the past one minute (the time period starting one minute before from the current time). Furthermore, the first upper light intensity threshold value A1 and the front light intensity threshold value B1 are indicated with dot-dash lines, respectively.

When the sensor apparatus 10, which is installed to the front glass of the vehicle 30, has entered the road area under the elevated bridge 41, the upper side of the vehicle 30 is covered with the elevated bridge 41, so that the upper light intensity A0 is rapidly decreased, and thereby a difference D1 between the current measurement of the upper light intensity A0 and an average value of the measurements of the upper light intensity, which are measured during the past one minute period, becomes large. Furthermore, the front light intensity B0 begins to decrease slightly before the entering of the vehicle 30 into the road area under the elevated bridge 41. The length (left-right length in FIG. 3) of the elevated bridge 41, which is measured along the travel path of the vehicle 30, is relatively short, so that the front light intensity B0 decreases slowly and is kept larger than the front light intensity threshold value B1.

In contrast, when the sensor apparatus 10, which is installed to the front glass of the vehicle 30, has entered the tunnel 42, the upper side of the vehicle 30 is covered with the wall of the tunnel 42, so that the upper light intensity A0 rapidly drops, and thereby a difference D2 between the current measurement of the upper light intensity A0 and the average value of the measurements of the upper light intensity, which are measured during the past one minute period, becomes large. The measurement of the upper light intensity A0, which is measured at the time of entering the tunnel 42, is higher than the measurement of the upper light intensity A0, which is measured at the time of entering the road area under the elevated bridge 41, due to the presence of the bright illumination provided by lamps 42a at the inlet of the tunnel 42. Furthermore, the front light intensity B0 begins to decrease slightly before the entering of the vehicle 30 into the tunnel 42 and becomes smaller than the front light intensity threshold value B1 at the time of entering of the vehicle 30 into the tunnel 42.

In the present embodiment, the turning on of the light apparatuses 70 is appropriately controlled by using the characteristic changes in the light intensities discussed with reference to FIG. 3. Specifically, there is provided an entry determining means for determining whether the vehicle 30 has entered the road area under the covering object, which is the physical structure that covers the upper side of the vehicle 30, based on the upper light intensity that is the light intensity of ambient light applied to the vehicle 30 from the upper side of the vehicle 30. In the state where it is determined that the vehicle 30 has entered the road area under the covering object, a fighting control means (described below) turns on the light apparatuses 70 when the upper light intensity A0 and the front light intensity B0 require the turning on of the light apparatuses 70. The lighting process, which turns on the light apparatuses 70, will be described with reference to the flowchart shown in FIG. 4.

When the light switch 51 is manipulated to turn on the auto light apparatus control system upon turning on of the ignition switch 50, this process is executed at 100 millisecond intervals.

First, at step S100, initialization (resetting) is performed on, for example, the RAM 24 and the timer 25.

At step S101, an average value C of measurements of the upper light intensity, which are measured during a past predetermined time period, i.e., latest predetermined time period (e.g., a past one minute period), which has just passed. This average value C of the measurements of the upper light intensity (hereinafter, simply referred to as the average value C of the upper light intensity) is thought to be an approximate value of the light intensity of the ambient light at the outside of the vehicle 30 at the time of traveling of the vehicle 30. The average value C of the upper light intensity corresponds to an upper light intensity reference value of the present invention.

Then, at step S102, the current measurement of the upper light intensity A0, which is measured with the upper light intensity sensor 11, is subtracted from the average value C of the upper light intensity that is computed at step S101. Then, it is determined whether the difference, which is obtained by subtracting the current measurement of the upper light intensity A0 from the average value C of the upper light intensity, is equal to or higher than the upper light intensity difference reference value E, which is stored in the EEPROM 23. Specifically, it is determined whether the relationship of $C-A0 \geqq E$ is satisfied. When it is determined that the relationship of $C-A0 \geqq E$ is satisfied at step S102 (i.e., YES at step S102), the operation proceeds to step S103. When the relationship of $C-A0 \geqq E$ is satisfied, the difference, which is obtained by subtracting the current measurement of the upper light intensity A0 from the average value C of the measurements of the upper light intensity A0 measured during the past one minute, is equal to or larger than the upper light intensity difference reference value E, and thereby, it is assumed that the upper light intensity A0 is rapidly decreased. Thus, it is assumed that the vehicle 30 has entered the road area under the covering object (i.e., the vehicle 30 is located in the road area under the covering object) at step S102. Therefore, in the following steps (steps at and after step S103), the light apparatuses 70 are rapidly turned on in the case where the covering object is the tunnel 42, or the light apparatuses 70 are kept turned off in the case where the covering object is the elevated bridge 41. In contrast, when the relationship of $C-A0<E$ is satisfied at step S102 (i.e., NO at step S102), the operation proceeds to step S106. In the case where the relationship of $C-A0<E$ is satisfied at step S102, the upper light intensity A0 is not rapidly decreased. Therefore, it is assumed that the vehicle 30 has not entered the road area under the covering object (i.e., the vehicle 30 is out of the road area under the covering object). Thus, in the operation at and after step S107, the lighting of the light apparatuses 70 is appropriately controlled based on the change in the light intensity of solar radiation.

In the case of satisfying the relationship of $C-A0 \geqq E$, i.e., in the case where the upper light intensity A0 is rapidly decreased, and thereby it is assumed that the vehicle 30 has entered the road area under the covering object (i.e., YES at step S102), the operation proceeds to step S103 where it is determined whether the measurement of the upper light intensity A0, which is measured with the upper light intensity sensor 11, is equal to or less than the first upper light intensity threshold value A1. As discussed above, the first upper light intensity threshold value A1 is larger than the second upper light intensity threshold value A2. When it is determined that the upper light intensity A0 is larger than the first upper light intensity threshold value A1 at step S103 (i.e., NO at step S103), the operation returns to step S101 without lighting the light apparatuses 70. In contrast, when it is determined that the upper light intensity A0 is equal to or smaller than the first upper light intensity threshold value A1 at step S103 (i.e., YES at step S103), the operation proceeds to step S104.

At step S104, it is determined whether the front light intensity B0, which is measured with the front light intensity sensor 12, is equal to or smaller than the front light intensity threshold value B1. When it is determined that the front light intensity B0 is larger than the front light intensity threshold value B1 at step S104 (i.e., NO at step S104), it is then assumed that the encountered covering object, under which the vehicle 30 is located, is not the tunnel 42. Therefore, the operation returns to step S101 without lighting the light apparatuses 70. In contrast, when it is determined that the front light intensity B0 is equal to or smaller than the front light intensity threshold value B1 at step S104 (i.e., YES at step S104), then it is assumed that the encountered covering object, under which the vehicle 30 is located, is the tunnel 42. At this time point, the timer 25 starts measuring the delay time, and the operation proceeds to step S105. At this moment, if the measuring of the delay time with the timer 25 has already started previously, the timer 25 keeps measuring the delay time.

As discussed above, when the front light intensity B0 is equal to or smaller than the front light intensity threshold value B1 (i.e., YES at step S104), the operation proceeds to step S105. At step S105, it is determined whether the delay time, which is measured with the timer 25, has reached the first delay time α (i.e., whether the first delay time α has elapsed). As discussed above, the first delay time α is equal to or shorter than the second delay time β. When it is determined that the first delay time α has not elapsed at step S105 (i.e., NO at step S105), the operation returns to step S101 and repeats the above-described steps. In contrast, when it is determined that the first delay time α has elapsed at step S105 (i.e., YES at step S105), the operation proceeds to step S108 where the light apparatuses 70 are turned on, and the present operation is terminated.

As discussed above, when the difference, which is obtained by subtracting the current measurement of the upper light intensity A0 measured with the upper light intensity sensor 11 from the average value C of the upper light intensity computed at step S101, is smaller than the upper light intensity difference reference value E (i.e., NO at step S102), the operation proceeds to step S106. At step S106, it is determined whether the current measurement of the upper light intensity A0, which is measured with the upper light intensity sensor 11, is equal to or smaller than the second upper light intensity threshold value A2. When it is determined that the upper light intensity A0 is larger than the second upper light intensity threshold value A2 at step S106 (i.e., NO at step S106), the operation returns to step S101 without lighting the light apparatuses 70. In contrast, when it is determined that the upper light intensity A0 is equal to or smaller than the second upper light intensity threshold value A2 at step S106 (i.e., YES at step S106), the operation proceeds to step S107. At this moment, if the measuring of the delay time with the timer 25 has already started previously, the timer 25 keeps measuring the delay time.

At step S107, it is determined whether the second delay time β has elapsed. When it is determined that the second delay time β has not elapsed at step S107 (i.e., NO at step S107), the operation returns to step S101 and repeats the above-described steps. In contrast, when it is determined that the second delay time β has elapsed at step S107 (i.e., YES at step S107), the operation proceeds to step S108 where the light apparatuses 70 are turned on, and the present operation is terminated.

After the turning on of the light apparatuses 70, when predetermined delay time has elapsed since the time, at which the upper light intensity measured with the upper light intensity sensor 11 becomes equal to or larger than a light-off threshold value, the light apparatuses 70 are turned off.

The light ECU 20 of the present embodiment serves as the lighting control means and an entry determining means. Furthermore, steps S103 to S108 of FIG. 4 correspond to the lighting control means, and step S102 of FIG. 4 corresponds to the entry determining means.

Now, referring back to FIG. 3, the lighting process of the light apparatuses 70 at the time of entry of the vehicle 30 into the road area under the elevated bridge 41 and the lighting process of the light apparatuses 70 at the time of entry into the road area in the tunnel 42 will be described.

First, the case of entering of the vehicle 30 into the road area under the elevated bridge 41 will be described. The upper light intensity A0 measured with the sensor apparatus 10 before the entry of the vehicle 30 into the road area under the elevated bridge 41 is constant. However, when the sensor apparatus 10 enters the road area under the elevated bridge 41, the upper light intensity A0 is rapidly decreased. A difference between the measurement of the upper light intensity A0 before the entry of the vehicle 30 into the road area under the elevated bridge 41 and the measurement of the upper light intensity A0 upon the presence of the vehicle 30 in the road area under the elevated bridge 41 is indicated by D1. It is assumed that this difference D1 is larger than the upper light intensity difference reference value E. Thereby, YES is returned at step S102 of FIG. 4. Furthermore, the measurement of the upper light intensity A0, which is measured with the sensor apparatus 10 upon the presence of the vehicle 30 in the road area under the elevated bridge 41, is smaller than the first upper light intensity threshold value A1. Thus, YES is returned at step S103 of FIG. 4. When the vehicle 30 enters the road area under the elevated bridge 41, the measurement of the front light intensity B0 does not become equal to or smaller than the front light intensity threshold vale B1. That is, NO is returned at step S104 of FIG. 4. Therefore, when the vehicle 30 enters the road area under the elevated bridge 41, the light apparatuses 70 are not turned on.

Next, the case of entering of the vehicle 30 into the road area under the tunnel 42 will be described. The upper light intensity A0 measured with the sensor apparatus 10 before the entry of the vehicle 30 into the road area in the tunnel 42 (i.e., the road area under the wall of the tunnel 42) is constant. However, when the sensor apparatus 10 enters the road area in the tunnel 42, the upper light intensity A0 is rapidly decreased. A difference between the measurement of the upper light intensity A0 before the entry of the vehicle 30 into the road area in the tunnel 42 and the measurement of the upper light intensity A0 upon the presence of the vehicle 30 in the road area in the tunnel 42 is indicated by D2. It is assumed that this difference D2 is larger than the upper light intensity difference reference value E. Thereby, YES is returned at step S102 of FIG. 4. Furthermore, the measurement of the upper light intensity A0 measured with the sensor apparatus 10 upon the presence of the vehicle 30 in the road area in the tunnel 42 is smaller than the first upper light intensity threshold value A1. Thus, YES is returned at step S103 of FIG. 4. Also, in the case where the tunnel 42 is located ahead of the vehicle 30, the measurement of the front light intensity B0 measured with the sensor apparatus 10 begins to decrease before entry of the vehicle 30 into the road area in the tunnel 42 and becomes smaller than the front light intensity threshold value B1 during the traveling of the vehicle 30 in the tunnel 42. That is, YES is returned at step S104 of FIG. 4. Thereafter, the light apparatuses 70 are turned on after elapse of the first delay time α.

Therefore, according to the present embodiment, in the case where the covering object, under which the vehicle 30 is located, is the elevated bridge 41, the light apparatuses 70 are kept turned off. Thereby, the flashing of the light apparatuses (particularly, the headlamps) 70 can be limited under the elevated bridge 41. Furthermore, in the case where the covering object, under which the vehicle 30 is located, is the tunnel 42, the light apparatuses 70 can be turned on. The first upper light intensity threshold value A1 is larger than the second upper light intensity threshold value A2, which is used in the case where the vehicle 30 is out of the road area under the covering object. Therefore, even when the inlet of the tunnel 42 is bright, the light apparatuses 70 can be appropriately turned on. Furthermore, the first delay time α is less than the second delay time β, which is used in the case where the vehicle 30 is out of the road area under the covering object. Therefore, when the vehicle 30 enters the tunnel 42, the light apparatuses 70 can be immediately turned on.

As discussed above, in the case of the light apparatus control system 1 of the present embodiment, when the difference, which is obtained by subtracting the current measurement of the upper light intensity A0 from the average value C of the measurements of the upper light intensity A0 measured during the past one minute period, is equal to or larger than the upper light intensity difference reference value E (i.e., YES at step S102), it is determined that the vehicle 30 has entered the road area under the coving object. In the case where it is determined that the vehicle 30 has entered the road area under the covering object, the light apparatuses 70 are turned on only upon satisfaction of the following three conditions: the measurement of the upper light intensity A0 is equal to or smaller than the first upper light intensity threshold value A1 (i.e., YES at step S103); the front light intensity B0 is equal to or smaller than the front light intensity threshold value B1 (i.e., YES at step S104); and the first delay time α has elapsed since the time of making the determination at step S104 (i.e., YES at step S105). Furthermore, in the case where the difference, which is obtained by subtracting the current measurement of the upper light intensity A0 from the average C of the measurements of the upper light intensity measured during the last one minute period, is smaller than the upper light intensity difference reference value E (i.e., NO at step S102), it is determined that the vehicle 30 is out of the road area under the covering object. In such a case, the light apparatuses 70 are turned on after elapse of the second delay time β from the time, at which it is determined that the current measurement of the upper light intensity A0 is equal to or smaller than the second upper light intensity threshold value A2 (i.e., YES at step S106).

In the present embodiment, the rapid decrease of the upper light intensity A0 is sensed when the difference, which is obtained by subtracting the current measurement of the upper light intensity A0 from the average value C of the measurements of the upper light intensity A0 measured during the past one minute period, is equal to or larger than the upper light intensity difference reference value E. In this way, the entering of the vehicle 30 into the road area under the covering object can be appropriately determined. In the state where it is determined that the vehicle 30 has entered the road area under the covering object, the light apparatuses 70 are turned on when the measurement of the upper light intensity A0 and the measurement of the front light intensity B0 are both equal to or smaller than the light-on threshold values, respectively. In the case where the covering object, under which the vehicle 30 is located, is the elevated bridge 41 that does not require the turning on of the light apparatuses 70, the decrease in the front light intensity B0 is slow due to the fact that the length of the covering object measured along the travel path of the vehicle 30 is relatively small. Therefore, when the front light intensity threshold value B1 is appropriately set, it is possible to determine whether the covering object, under which the vehicle 30 is located, is the covering object (e.g., the tunnel 42), which requires the turning on of the light apparatuses 70, or is the covering object (e.g., the elevated bridge 41), which does not require the turning on of the light apparatuses 70. In this way, the light apparatuses 70 are turned on when the vehicle 30 enters the road area under the covering object, such as the tunnel 42, which requires the turning on of the light apparatuses 70. Also, the light apparatuses 70 are kept turned off when the vehicle 30 enters the road area under the covering object, such as the elevated bridge 41, which does not require the turning on of the light apparatuses 70, so that the flashing of the light apparatuses 70 can be advantageously limited under such a covering object.

Also, in the case where it is determined that the vehicle 30 is out of the road area under the covering object, the light apparatuses 70 are turned on when the measurement of the upper light intensity A0 is equal to or smaller than the second upper light intensity threshold value A2. In the case where the vehicle 30 is out of the road area under the covering object, the lighting of the light apparatuses 70 is controlled based only on the upper light intensity A0. Therefore, it is possible to appropriately control the lighting of the light apparatuses 70 without being influenced by the presence of the sunset light or sunrise light.

Furthermore, according to the present embodiment, the first upper light intensity threshold value A1, which is used in the case where it is determined that the vehicle 30 has entered the road area under the covering object, is larger than the second upper light intensity threshold value A2, which is used in the case where it is determined that the vehicle 30 is out of the road area under the covering object. That is, the upper light intensity threshold value, which is used when the vehicle 30 is in the road area under the covering object, is set to be larger than the upper light intensity threshold value, which is used when the vehicle 30 is out of the road area under the covering object. Therefore, the light apparatuses 70 can be reliably turned on even at the tunnel 42 where the inlet is bright.

Furthermore, according to the present embodiment, the first delay time α, which is used in the case where it is determined that the vehicle 30 has entered the road area under the covering object, is shorter than the second delay time β, which is used in the case where it is determined that the vehicle 30 is out of the road area under the covering object. In the case where the vehicle 30 has entered the road area under the covering object, the light apparatuses 70 are turned on after elapse of the delay time, which is shorter than the delay time set for the case where the vehicle 30 is out of the road area under the covering object. Therefore, the light apparatuses 70 can be turned on immediately upon the entry of the vehicle 30 into the tunnel 42.

Now, modifications of the above embodiment will be described.

In the above embodiment, the sensor apparatus 10 is installed to the interior side surface of the front glass (windshield) of the vehicle. Alternatively, the sensor apparatus 10 may be installed to any other appropriate location of the vehicle, such as a dashboard. Also, the upper light intensity sensor and the front light intensity sensor may be installed to two different locations, respectively, of the vehicle.

In the above embodiment, the first upper light intensity threshold value, the second upper light intensity threshold value and the front light intensity threshold value are stored in the EEPROM as the light intensity references used in the lighting process of the light apparatuses. These values may be the same common value or may be different values, respectively. Also, these values may be set differently for each of the light apparatuses (e.g., for each of the headlamp and the tail lamp). Furthermore, the first delay time and the second delay time, which are stored in the EEPROM, may be the same common value or may be different values, respectively. Also, these values may be set differently for each of the light apparatuses (e.g., for each of the headlamp and the tail lamp).

In the above embodiment, the front light intensity threshold value is pre-stored in the EEPROM. Alternatively, the front light intensity threshold value may be variably set depending on the light intensity of the ambient light outside of the vehicle and/or the lighting state of the light apparatuses (i.e., the lighting on/off of the light apparatuses). The light intensity of the ambient light may be an average value of the measurements of the upper light intensity, which are measured during a last predetermined time period. In this way, the lighting process of the light apparatuses can be appropriately executed even in the case where the vehicle enters a tunnel, in which the light level of the lamps is varied depending on the light intensity of the ambient light outside of the tunnel.

Furthermore, in the above embodiment, the upper light intensity difference reference value is pre-stored in the EEPROM. Alternatively, the upper light intensity difference reference value may be set depending on the upper light intensity reference value. For example, in the case where the light intensity is high during, for example, daylight in the clear weather, the light intensity may change frequently due to the influences of, for example, the shade created by roadside trees. Therefore, the upper light intensity difference reference value may be set to be large in such a case. Then, at dusk time or cloudy weather, the upper light intensity difference reference value may be set to be small due to the low upper light intensity even in the absence of the covering object. In this way, it is more appropriately determined whether the vehicle has entered the road area under the covering object in view of the surrounding environment outside of the vehicle.

The present invention is not limited the above embodiment and modifications thereof. That is, the above embodiment and modifications thereof may be modified in various ways without departing from the spirit and scope of the invention.

What is claimed is:

1. A light apparatus control system for a vehicle, comprising:
    a light apparatus that illuminates a space outside of the vehicle upon turning on thereof;
    a drive means for driving the light apparatus to turn on or off the light apparatus;
    a lighting control means for controlling the drive means to turn on or off the light apparatus based on a light intensity of ambient light applied from outside of the vehicle;
    an upper light intensity sensing means for measuring an upper light intensity of the ambient light that is applied from an upper side of the vehicle;
    a front light intensity sensing means for measuring a front light intensity of the ambient light that is applied from a front side of the vehicle; and
    an entry determining means for determining whether the vehicle has entered an area under a covering object that covers the upper side of the vehicle, wherein in the case where the entry determining means determines that the vehicle has entered the area under the covering object, the lighting control means turns on the light apparatus by controlling the drive means when both of a measurement of the upper light intensity, which is measured with the upper light intensity sensing means, and a measurement of the front light intensity, which is measured with the front light intensity sensing means, require the turning on of the light apparatus.

2. The light apparatus control system according to claim 1, wherein in the case where the entry determining means determines that the vehicle has not entered the area under the covering object, the lighting control means turns on the light apparatus by controlling the drive means when the measurement of the upper light intensity indicates that the light apparatus needs to be turned on.

3. The light apparatus control system according to claim 2, wherein:
    in the case where the entry determining means determines that the vehicle has entered the area under the covering object, the lighting control means turns on the light apparatus by controlling the drive means upon elapse of first delay time;
    in the case where the entry determining means determines that the vehicle has not entered the area under the covering object, the lighting control means turns on the light apparatus by controlling the drive means upon elapse of second delay time; and
    the first delay time is equal to or shorter than the second delay time.

4. The light apparatus control system according to claim 1, wherein in the case where the entry determining means determines that the vehicle has entered the area under the covering object, the lighting control means turns on the light apparatus by controlling the drive means when the measurement of the upper light intensity is smaller than a first upper light intensity threshold value while the measurement of the front light intensity is smaller than a front light intensity threshold value.

5. The light apparatus control system according to claim 4, wherein the front light intensity threshold value is set according to the light intensity of the ambient light outside of the vehicle.

6. The light apparatus control system according to claim 4, wherein the front light intensity threshold value is set according to a lighting state of the light apparatus.

7. The light apparatus control system according to claim 4, wherein:
    in the case where the entry determining means determines that the vehicle has not entered the area under the covering object, the lighting control means turns on the light apparatus by controlling the drive means when the measurement of the upper light intensity is smaller than a second upper light intensity threshold value; and the first upper light intensity threshold value is equal to or larger than the second upper light intensity threshold value.

8. The light apparatus control system according to claim 1, wherein the entry determining means determines that the vehicle has entered the area under the covering object when a difference, which is obtained by subtracting the current measurement of the upper light intensity from an upper light intensity reference value, is larger than an upper light intensity difference reference value.

9. The light apparatus control system according to claim 8, wherein the upper light intensity reference value is an average value of a plurality of measurements of the upper light intensity, which are measured during a past predetermined time period.

10. The light apparatus control system according to claim 8, wherein the upper light intensity difference reference value is set according to the upper light intensity reference value.

11. The light apparatus control system according to claim 1, wherein the entry determining means determines whether the vehicle has entered the area under the covering object based on at least one of the measurement of the upper light intensity, which is measured with the upper light intensity sensing means, and the measurement of the front light intensity, which is measured with the front light intensity sensing means.

12. A light apparatus control system for a vehicle, comprising:
a light apparatus that illuminates a space outside of the vehicle upon turning on thereof;
a drive device that drives the light apparatus to turn on or off the light apparatus;
a controller that controls the drive device to turn on or off the light apparatus;
an upper light intensity sensor that measures an upper light intensity of an ambient light, which is applied from an upper side of the vehicle; and
a front light intensity sensor that measures a front light intensity of the ambient light that is applied from a front side of the vehicle, wherein:
the controller determines whether the vehicle has entered an area under a covering object that covers the upper side of the vehicle based on at least one of a measurement of the upper light intensity, which is measured with the upper light intensity sensor, and a measurement of the front light intensity, which is measured with the front light intensity sensor;
the controller determines whether the light apparatus needs to be turned on based on both of the measurement of the upper light intensity, which is measured with the upper light intensity sensor, and the measurement of the front light intensity, which is measured with the front light intensity sensor, when the controller determines that the vehicle has entered the area under the covering object; and
the controller turns on the light apparatus by controlling the drive device when the controller determines that the light apparatus needs to be turned on.

13. The light apparatus control system according to claim 12, wherein in the case where the controller determines that the vehicle has not entered the area under the covering object, the controller turns on the light apparatus by controlling the drive device when the measurement of the upper light intensity indicates that the light apparatus needs to be turned on.

14. The light apparatus control system according to claim 13, wherein:
in the case where the controller determines that the vehicle has entered the area under the covering object, the controller turns on the light apparatus by controlling the drive device upon elapse of first delay time;
in the case where the controller determines that the vehicle has not entered the area under the covering object, the controller turns on the light apparatus by controlling the drive device upon elapse of second delay time; and
the first delay time is equal to or shorter than the second delay time.

15. The light apparatus control system according to claim 12, wherein in the case where the controller determines that the vehicle has entered the area under the covering object, the controller turns on the light apparatus by controlling the drive device when the measurement of the upper light intensity is smaller than a first upper light intensity threshold value while the measurement of the front light intensity is smaller than a front light intensity threshold value.

16. The light apparatus control system according to claim 15, wherein the front light intensity threshold value is set according to the light intensity of the ambient light outside of the vehicle.

17. The light apparatus control system according to claim 15, wherein the front light intensity threshold value is set according to a lighting state of the light apparatus.

18. The light apparatus control system according to claim 15, wherein:
in the case where the controller determines that the vehicle has not entered the area under the covering object, the controller turns on the light apparatus by controlling the drive device when the measurement of the upper light intensity is smaller than a second upper light intensity threshold value; and
the first upper light intensity threshold value is equal to or larger than the second upper light intensity threshold value.

19. The light apparatus control system according to claim 12, wherein the controller determines that the vehicle has entered the area under the covering object when a difference, which is obtained by subtracting the current measurement of the upper light intensity from an upper light intensity reference value, is larger than an upper light intensity difference reference value.

20. The light apparatus control system according to claim 19, wherein the upper light intensity reference value is an average value of a plurality of measurements of the upper light intensity, which are measured during a past predetermined time period.

21. The light apparatus control system according to claim 19, wherein the upper light intensity difference reference value is set according to the upper light intensity reference value.

* * * * *